G. S. STUART.
EMERGENCY DEVICE FOR USE WITH AUTOMOBILES.
APPLICATION FILED APR. 10, 1919.
1,325,422.
Patented Dec. 16, 1919.
2 SHEETS—SHEET 1.
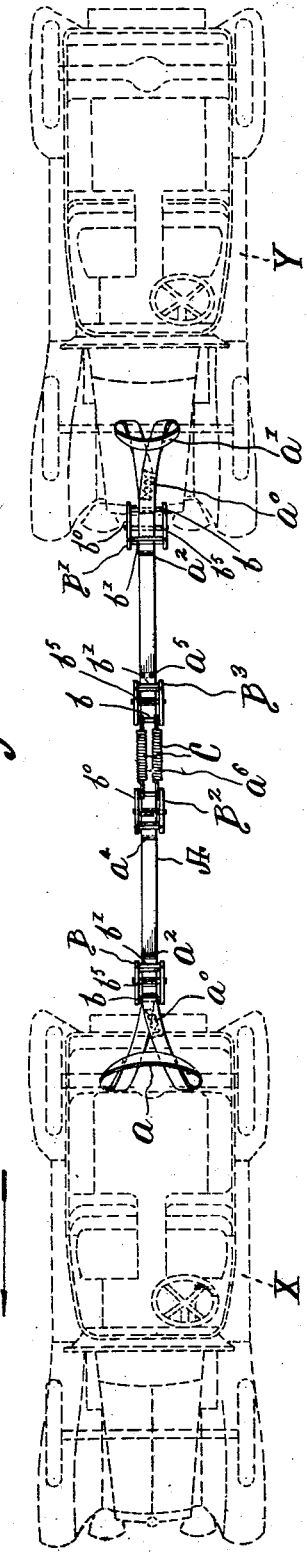
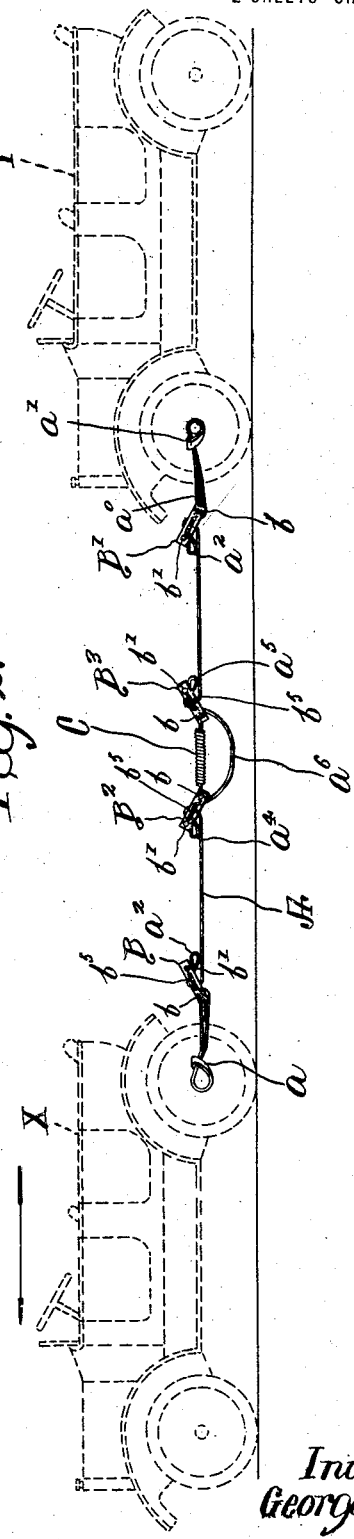
Inventor.
George S. Stuart
by Wilkinson & Giusta,
Attorneys.

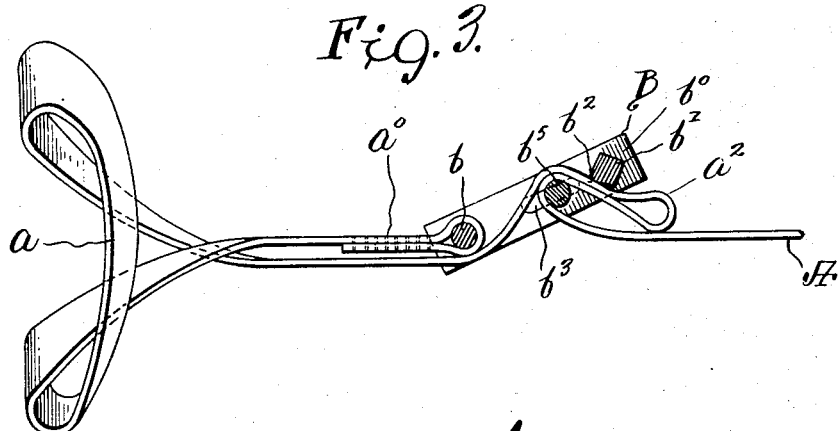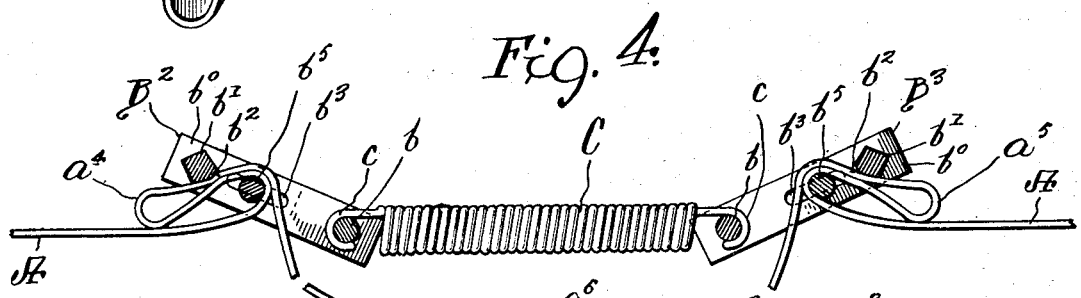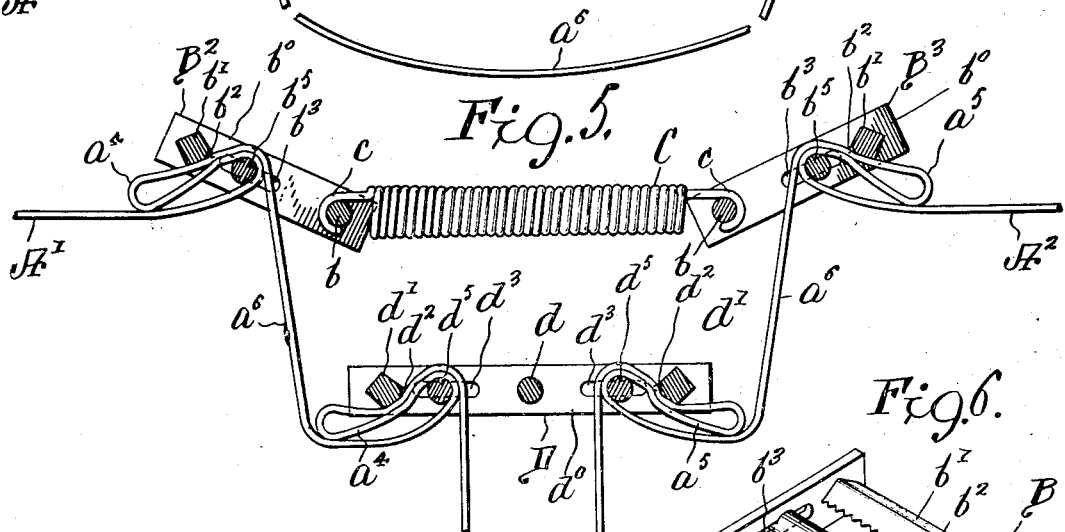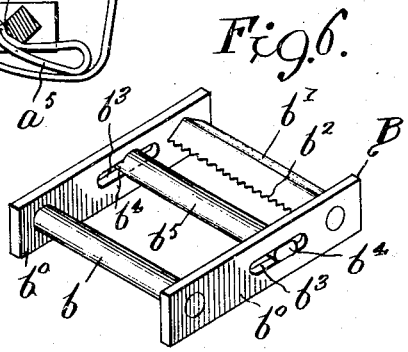

UNITED STATES PATENT OFFICE.

GEORGE S. STUART, OF WASHINGTON, DISTRICT OF COLUMBIA.

EMERGENCY DEVICE FOR USE WITH AUTOMOBILES.

1,325,422.  Specification of Letters Patent.  Patented Dec. 16, 1919.

Application filed April 10, 1919. Serial No. 288,991.

*To all whom it may concern:*

Be it known that I, GEORGE S. STUART, a citizen of the United States, residing at Washington, in the District of Columbia, have invented certain new and useful Improvements in Emergency Devices for Use with Automobiles; and I do hereby declare the following to be a full, clear and exact description of the invention, such as will enable others skilled in the art to which it appertains to make and use the same.

My present invention is intended to provide an emergency device in the form of a flexible band with the attachments hereinafter described, which may be conveniently rolled up and carried in a small space in an automobile, and may be used for the various purposes hereinafter stated and others for which it may be especially adapted.

According to my present invention I provide a flexible strap which may be made of leather or suitable textile fabric, preferably coated with rubber, gum, or other material to protect the same from the weather and keep out mud and water, to which I attach suitable clasps, and to which may be attached by detachable clasp suitable coil springs to take up the shock of any strains suddenly imposed upon said strap.

The strap may also be provided with studs or rivets so as to enable the strap to be temporarily used as an anti-skidding attachment for one or more of the wheels of the automobile so as to enable the said wheels to obtain a grip on the roadway, and thus to assist the automobile to be moved forward or backward by its own power should it be stalled.

My invention will be more fully understood after reference to the accompanying drawings, in which like parts are indicated by similar reference symbols throughout the several views, and in which:—

Figure 1 is a plan view of the complete device as used in towing one automobile by means of another, the movement of the automobiles being in the direction of the arrows.

Fig. 2 is a side elevation of the arrangement shown in Fig. 1.

In both Figs. 1 and 2, the automobiles are shown in dotted lines.

Fig. 3 is an enlarged view of one end of the strap with the clasp secured to said end and the bight of the strap rove through the same.

Fig. 4 shows a side elevation on a larger scale of the spring arrangement interposed between the two ends of the strap for easing up sudden strains imposed on the strap.

In Figs. 1 to 4 a single strap is shown as used.

Fig. 5 is a similar view to Fig. 4, but shows two straps connected together by a double clasp.

In Figs. 3 to 5, the clasps are all shown in central, longitudinal, vertical section, and Fig. 6 is a detail showing one of the clasps as detached from the strap.

Referring to Figs. 1 and 2, X represents the towing automobile, and Y the automobile being towed, the two being connected together by the emergency device, as will be hereinafter described.

Referring to Figs. 1 to 4, the emergency device is shown as comprising a single strap A, having clasps B and B' secured at each end thereof as by means of the stitches $a^0$, see Figs. 1 and 3.

The clasp B is preferably made smaller than the clasp B' so that it may be rove through the latter in connecting the two automobiles as shown.

The construction of each clasp is shown in detail in Fig. 6, in which $b$ and $b'$ are transverse rods connecting the side members $b^0$. The rod $b$ is preferably round, as shown, and the rod $b'$ is preferably provided with engaging teeth $b^2$, but such teeth are not necessary as the binding effect of the clasp will be sufficient without the same.

The two side bars $b^0$ of the clasp are slotted, as at $b^3$, to receive the reduced ends $b^4$ of the sliding bar $b^5$.

In Figs. 1 and 2, I have shown two of the clasps B and B' permanently attached to the strap A, and two similar clasps $B^2$ and $B^3$ detachably connected to bights of the strap, as shown in Figs. 1, 2 and 4. In order to relieve the strap of excessive strain, when sudden tension is applied to the same, as when one automobile starts to pull another out of a rut, I provide a spring tension arrangement consisting of one or more coil springs C, having hooks $c$ at the opposite ends of each, which hooks engage the cross rods $b$ of the adjacent clasps, as shown in Figs. 4 and 5.

In the arrangement shown in Figs. 1 to 4, the clasp B is rove through the larger clasp B', forming a loop $a'$ in the strap engaging the front axle of the automobile Y being towed, and the other end of the strap is then carried around the rear axle of the towing automobile X, forming a loop $a$; the bight $a^2$ of the strap being caught between the sliding bar $b^5$ and the fixed bar $b'$ of the clasp B, as shown in Fig. 3.

When in this position, any tension on the strap A will cause the bar B to bind the bight $a^2$ firmly between the sliding bar $b^5$, and the fixed bar $b'$ of the clasp B. For ordinary purposes, when towing on smooth roads, it would not be necessary to include the spring arrangement C shown in Figs. 1, 2, 4 and 5; but where it is desired to pull an automobile out of a rut, or to tow it along a rough road, a suitable spring tension arrangement will be necessary to prevent the excessive strain from breaking the strap; and such an arrangement I have shown in Figs. 1, 2, 4 and 5, which comprises two coil springs C having their hooks $c$ engaging the fixed bars $b$ of the oppositely disposed clasps $B^2$ and $B^3$. Bights $a^4$ and $a^5$ of the strap are then rove through the clasps, as indicated in Figs. 4 and 5, leaving a slack portion $a^6$ of the strap beneath the springs C. The shock of any sudden strains on the strap A would be taken up by the springs C, and the danger of the strap breaking from excessive strain would ordinarily be avoided.

Instead of having a single strap A, as shown in Figs. 1 to 4, I may have two separate straps A' and $A^2$, as shown in Fig. 5, the free ends of which may be connected together by a double clasp arrangement D, which comprises a central fixed bar $d$, two end fixed bars $d'$, which may be provided with teeth $d^2$, and side members $d^0$ connecting said bars, and slotted as at $d^3$. Projecting into these slots $d^3$ are the ends of the sliding bars $d^5$, and if the bights of the free ends of the strap are rove between these sliding bars, and the fixed bars $d'$, as shown at $a^4$ and $a^5$ in Fig. 5, the two straps would be securely connected together, should the springs C break, or be removed.

It will be seen that the clasps $B^2$ and $B^3$ and the springs C may be attached to or removed from the strap or straps when desired, and the strap or straps may be rolled up into a compact roll, and the other parts separately stowed if desired.

While I have shown the device as consisting of one or two straps used for towing one automobile from another, or for an anti-skidding attachment for a tire, it will be obvious that the straps may be used for securing trunks, or other baggage onto the sides or rear of an automobile, or for other purposes where straps or ropes, or the like are required.

While I prefer to make the straps of flexible textile fabric, coated with rubber, balata, or other gum or paint, or tar, leather or rawhide, or other suitable material may be used.

While I have shown two coil springs C, I prefer two so as to keep the strap from twisting, a single coil spring might be used, or more than two might be used if desired.

It will be obvious that various modifications might be made in the herein described apparatus, and in the combination and arrangement of parts which could be used without departing from the spirit of my invention; and I do not mean to limit the invention to such details except as particularly pointed out in the claims.

Having thus described my invention what I claim and desire to secure by Letters Patent of the United States is:

1. An emergency device for use with automobiles comprising a strap having a clasp attached to one end thereof and a larger clasp attached to the other end thereof so constructed that the small clasp may be rove through the larger, with detachable clasps adapted to be connected with bights formed in the said strap between said first-mentioned clasps, and a coil spring interposed between said detachable clasps adapted to relieve excessive strains imposed upon said strap, substantially as described.

2. An emergency device for use with automobiles comprising a flat strap having a clasp attached to one end thereof and a larger clasp attached to the other end thereof so constructed that the small clasp may be rove through the larger, with detachable clasps adapted to be connected with bights formed in the said strap between said first-mentioned clasps, and coil springs interposed between said detachable clasps adapted to relieve excessive strains imposed upon said strap, substantially as described.

3. An emergency device for use with automobiles comprising a strap having a clasp attached to one end thereof and a larger clasp attached to the other end thereof so constructed that the small clasp may be rove through the larger, with detachable clasps adapted to be connected with bights formed in the said strap between said first-mentioned clasps, each of said clasps comprising slotted parallel side bars, fixed rods connecting said side bars, on each side of the slots therein, and a sliding bar having its ends slidably mounted in said slots, and a coil spring interposed between said detachable clasps adapted to relieve excessive strains imposed upon said strap, substantially as described.

4. An emergency device for use with automobiles comprising a flat strap having a clasp attached to one end thereof and a larger clasp attached to the other end thereof so constructed that the small clasp may be rove through the larger, with detachable clasps adapted to be connected with bights formed in the said strap between said first-mentioned clasps, each of said last-mentioned clasps comprising slotted parallel side bars, fixed rods connecting said side bars, on each side of the slots therein, and a sliding bar having its ends slidably mounted in said slots, and coil springs interposed between said detachable clasps adapted to relieve excessive strains imposed upon said strap, substantially as described.

5. A towing device having clamps at its ends for securing the same respectively to a towing and a towed vehicle, and having intermediate the end clamps, a loop with a detachable clasp at each end of said loop, and coil springs interposed between said detachable clasps and serving as a shock absorber to the device, substantially as described.

GEORGE S. STUART.